(No Model.) 2 Sheets—Sheet 1.

F. H. PATTERSON.
PHOTOGRAPHIC CAMERA.

No. 378,973. Patented Mar. 6, 1888.

WITNESSES:
C. Neveux
C. Sedgwick

INVENTOR:
F. H. Patterson
BY Munn & Co
ATTORNEYS.

(No Model.) 2 Sheets—Sheet 2.

F. H. PATTERSON.
PHOTOGRAPHIC CAMERA.

No. 378,973. Patented Mar. 6, 1888.

WITNESSES:
C. Neveux
E. Sedgwick

INVENTOR:
F. H. Patterson
BY Munn & Co.
ATTORNEYS.

UNITED STATES PATENT OFFICE.

FRANCIS H. PATTERSON, OF NORRISTOWN, PENNSYLVANIA.

PHOTOGRAPHIC CAMERA.

SPECIFICATION forming part of Letters Patent No. 378,973, dated March 6, 1888.

Application filed October 15, 1887. Serial No. 252,438. (No model.)

*To all whom it may concern:*

Be it known that I, FRANCIS H. PATTERSON, of Norristown, in the county of Montgomery and State of Pennsylvania, have invented a new and useful Improvement in Photographic Cameras, of which the following is a full, clear, and exact description.

This invention relates, in part, to photographic cameras having swinging backs; also to cameras having reversible backs—that is, cameras in which the back or box of the instrument is made capable of angular adjustment relatively to the lens to equalize the focus on tall objects or objects of varying prominence in their height, and cameras in which the back or box of the instrument is capable of being reversed or adjusted to place its greater axis either in a horizontal or a vertical plane, as required.

The invention consists in certain novel constructions and combinations of parts for effecting either or both of these adjustments; also, in a novel means for providing for the adjustment of the front or lens end of the camera, in rising and falling directions, to obtain the necessary exposure of sky or foreground, and in a rotatable direction in common with the reversible back or box of the instrument, said adjustable front end having combined with it a special means for speedily releasing and securely holding it in position, all substantially as hereinafter described, and pointed out in the claims.

Reference is to be had to the accompanying drawings, forming a part of this specification, in which similar letters of reference indicate corresponding parts in all the figures.

Figure 1:
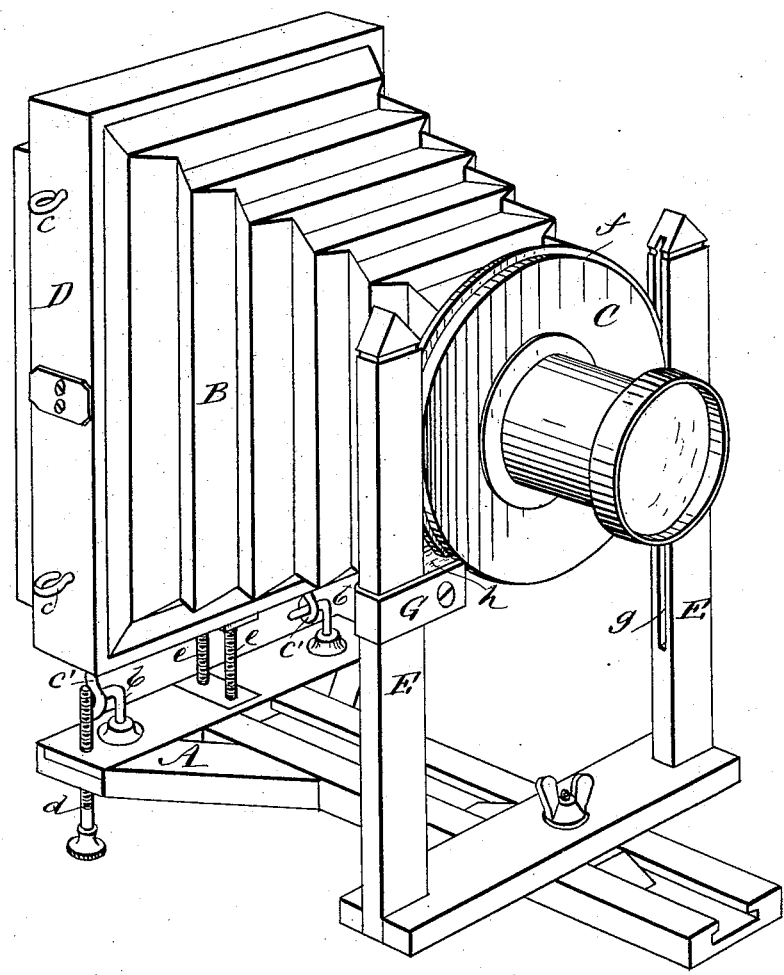
Figure 2:
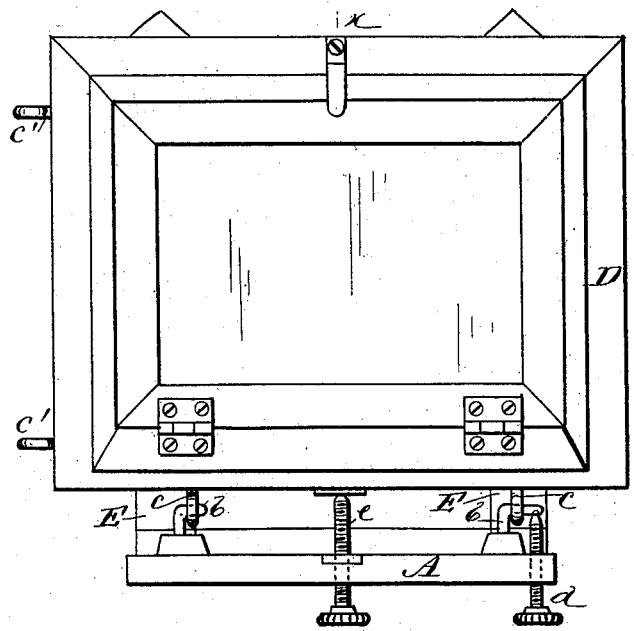
Figure 3:
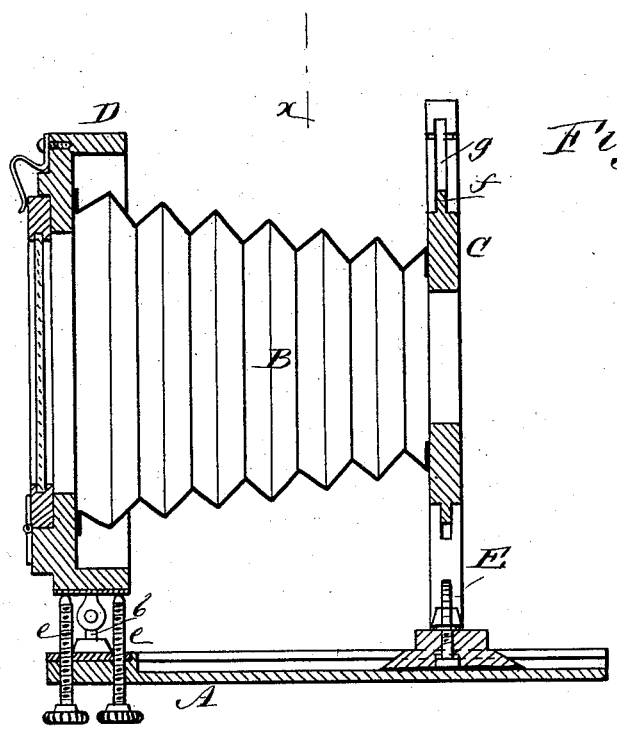

Figure 1 represents a view in perspective of a photographic bellows-camera embodying my invention, with the greater axis of the back or box adjusted to occupy a vertical position. Fig. 2 is a rear view, with the greater axis of the back or box adjusted to occupy a horizontal position; and Fig. 3 is vertical section upon the line $x\ x$ in Fig. 2.

A is the table or base of the camera, constructed to provide in any suitable manner for the longitudinal or focusing adjustment along it of the front end frame of the instrument.

B is the bellows of the camera, C its front end board or lens-mount, and D its oblong back or box.

The back D is both a swing and reversible one, as hereinbefore described. It is attached to the base A by hooks $b\ b$, mounted on the rear portion of the base, and here shown as pointing in the same direction across it to provide for the ready engagement and disengagement of the back D by a simple lateral movement. The back D is engaged with these hooks in a free or loose manner by means of eyes $c\ c$ or $c'\ c'$ on the exterior of its lower longer side and exterior of one of its shorter sides, accordingly as it is required to place the greater axis of the back or box in a horizontal or in a vertical plane, the back or box D being slid laterally from engagement by either one pair of its eyes $c\ c$ or $c'\ c'$, and after being turned or reversed made to engage by the other pair of said eyes with the hooks $b\ b$. When the back or box is thus engaged with the hooks, either in direction of its greater or lesser axis, as circumstances may require, the engagement is secured and the back prevented from slipping off the hooks by suitably turning a screw, $d$, so as to close against one of the hooks $b$. This provides for the ready reversal of the oblong box or back, so as to take pictures either which are longer horizontally than vertically, or vice versa, and at the same time the attachment provides for the swinging of the back by the freedom of the eyes $c\ c$ or $c'\ c'$ upon the hooks $b\ b$.

To level the swing-back D, however, so as to make it occupy a vertical position when required, and to adjust said back to any desired angle forward or backward relatively to a vertical plane to equalize the focus when photographing objects of considerable height or varying prominence at different parts of their height, as also to clamp or hold the back when adjusted, as required, there are provided in or connected with the rear portion of the base A, preferably about the middle of it and on opposite sides of an axial line passing through the bearing or nose portions of the hooks $b\ b$, two set or adjusting screws, $e\ e$, upon which the back D is free to rest or be supported by in both positions of its reversal— that is, with its greater axis in a horizontal plane or in a vertical one. By unscrewing one of these set-screws and screwing up the other the reversible swing-back D is clamped or held in any of its desired positions, vertical or angular.

The bellows B is secured at its rear end to the back D and at its forward end to the front board or lens-mount, C. This front board, C, is of annular form or circular form externally, with a circular tongue, $f$, on its outer periphery. Said circular tongue fits within upright grooves $g$ in side posts or uprights, E E, of the focusing sliding frame on the base A. This construction of the front end board, C, and fit of the same within the grooved uprights E E of the sliding or focusing frame not only serves to provide for the expansion and contraction of the bellows by the sliding of said frame in or out, but for the turning of the bellows in common with the front end board, C, and the back or box D upon reversing said back to bring its greater axis either into a horizontal or vertical plane, and when clamping the turned or adjusted back, as described, the whole is made rigid and secure, ready for use. The fit of the circular front end board, C, within the grooves $g$ of the upright posts E E of the sliding frame also provides, by one and the same board, for raising or lowering the front end of the camera and lens-tube to adapt it to different exposures of sky or foreground, and when said front board, C, has been adjusted as required, either axially or up and down, it is securely held in position at any desired point by simply moving a lever-like band or strap, G, on one of the uprights E up against it. This lever-like band G forms a stop and lock to the board C, and may be constructed of a simple strap of metal, arranged to freely clip the upright E, to which it is applied, and made to extend beyond the inner side of said upright, where it is fitted with a block, $h$, that bears against the outer peripheral portion of the board C, so that said stop G, when borne down on by the board C, will securely hold the latter in place by friction, yet by a slight manipulation of said stop it may readily be released to slide on its upright E and be relieved of pressure on the board C, and be as readily adjusted up or down to provide for any changed adjustment of the board C, as and for the purposes hereinbefore described.

Having thus fully described my invention, I claim as new and desire to secure by Letters Patent—

1. The combination, with the base A, of the hooks $b$ thereon, the detachable oblong camera-back D, having eyes $c$ and $c'$ upon a long and a short side, respectively, of it, and the closing-screw $d$, essentially as described.

2. The combination of the detachable oblong camera-back D, having eyes $c\ c'$ upon a long and a short side, respectively, of it, the base A, the hooks $b$ thereon, and the adjusting and clamping screws $e\ e$, for operation in relation with each other, substantially as and for the purposes specified.

3. In a photographic camera, the combination of the grooved uprights E E of the focusing-slide, the camera-bellows B, the circular front end board or lens-mount, C, attached to said bellows, and provided with a circular tongue, $f$, adapted to fit the grooves in said uprights, and the sliding lever-stop G, essentially as described.

4. The combination of the circular front end board, C, having a tongue, $f$, on its periphery, the grooved uprights E E of the focusing-slide, the sliding lever stop or clamp G, the bellows B, the reversible swing-back D, having eyes $c\ c'$ on a longer and shorter side, respectively, the base A, the hooks $b\ b$, and the adjusting and clamping screws $e\ e$, substantially as shown and described.

FRANCIS H. PATTERSON.

Witnesses:
W. H. SLINGLUFF,
W. C. TRIPLER, Jr.